United States Patent [19]

Osting

[11] 4,360,210
[45] Nov. 23, 1982

[54] WHEEL GLIDE

[76] Inventor: Helen L. Osting, 5313 C Tara Ct. North, Indianapolis, Ind. 46224

[21] Appl. No.: 211,254

[22] Filed: Nov. 28, 1980

Related U.S. Application Data

[62] Division of Ser. No. 87,235, Oct. 22, 1979, abandoned.

[51] Int. Cl.³ .............................................. B62B 19/02
[52] U.S. Cl. ..................................... 280/13; 280/7.12; 280/DIG. 3
[58] Field of Search ...................... 280/7.12, 8, 10, 11, 280/13, 28.5, DIG. 3; 180/183; 301/39 CC; 152/185.1, 167, 187, 152

[56] References Cited

U.S. PATENT DOCUMENTS

| | | | |
|---|---|---|---|
| 1,208,149 | 12/1916 | Haning | 152/185.1 |
| 1,472,880 | 11/1923 | Mahr | 280/13 |
| 3,618,963 | 11/1971 | Romano | 280/7.12 |
| 4,163,564 | 8/1979 | Kramer | 280/10 |

FOREIGN PATENT DOCUMENTS 162323 2/1949 Austria ................................. 280/13
10514 of 1894 United Kingdom ........... 301/39 CC Primary Examiner—David M. Mitchell
Attorney, Agent, or Firm—Woodard, Weikart, Emhardt & Naughton

[57] ABSTRACT

A wheel glide removably mountable to a wheel. A pair of rigid runners are hinged together to allow the positioning of a wheel atop one of the runners with the remaining runner extending upwardly partially around the wheel. A plurality of clamps fixedly mounted to the runners removably and grippingly engage the wheel. In a second embodiment, a longitudinally flexible but laterally rigid strip of material extends peripherally around the wheel and is removably secured thereto by a plurality of clamps. A tie engages two of the clamps to secure the opposite ends of the strip together.

1 Claim, 5 Drawing Figures

WHEEL GLIDE

This is a division of application Ser. No. 87,235, filed Oct. 22, 1979, now abandoned.

BACKGROUND OF THE INVENTION

This invention is in the field of runners which are removably attachable to vehicles, carts or carriages immediately adjacent or near the wheel thereof allowing the wheel to be glided across snow or ice. A number of U.S. Patents have been granted disclosing runners and similar items for a variety of carriages. For example U.S. Pat. Nos. 3,851,891 and 4,163,564 disclose mounting skis or skids on carts including shopping carts. The U.S. Pat. Nos. 1,128,698 and 2,480,256 disclose runners mounted to sleighs and baby carriages. The U.S. Pat. No. 3,630,301 discloses a ski mounted to a powered cycle. Despite the prior devices, there is still a need for a device which is removably mountable to a wheel for gliding the wheel across a snowy or icy surface. Such a device could be mounted to the wheels of a grocery cart thereby allowing a person to use the cart in snowy or icy weather.

SUMMARY OF THE INVENTION

One embodiment of the present invention is a ski removably attachable to a wheel comprising a rigid elongated horizontal runner having a bottom surface of suitable width to support a load atop snow, an upwardly extending plow runner aligned with and connected to the horizontal runner, connecting means between the horizontal runner and the plow runner being contiguous thereto and operable to allow the plow runner to be swung upwardly to extend partially around a wheel positioned atop the horizontal runner, and clamp means on the horizontal runner and the plow runner being operable to removably engage the wheel and removably secure the wheel to the horizontal runner and the plow runner.

A further embodiment of the present invention is a ski removably attachable to a wheel comprising a longitudinally flexible but laterally rigid strip of material with opposite ends and extendable peripherally around a wheel, the strip having a width of at least one and one-half times the width of the wheel to support same atop snow, clamp means fixedly mounted on the strip and engageable with the wheel being operable to removably hold the strip peripherally on the wheel, and strip fastening means engaged with the clamp means and operable to hold the ends together while the strip is on the wheel.

It is an object of the present invention to provide a wheel glide.

A further object of the present invention is to provide a ski removably mountable to a wheel of a cart.

Yet another object of the present invention is to provide a wheel mountable ski designed to fit different sizes of wheels.

Related objects and advantages of the present invention will be apparent from the following description.

DESCRIPTION OF THE PREFERRED EMBODIMENTS

Figure 1:
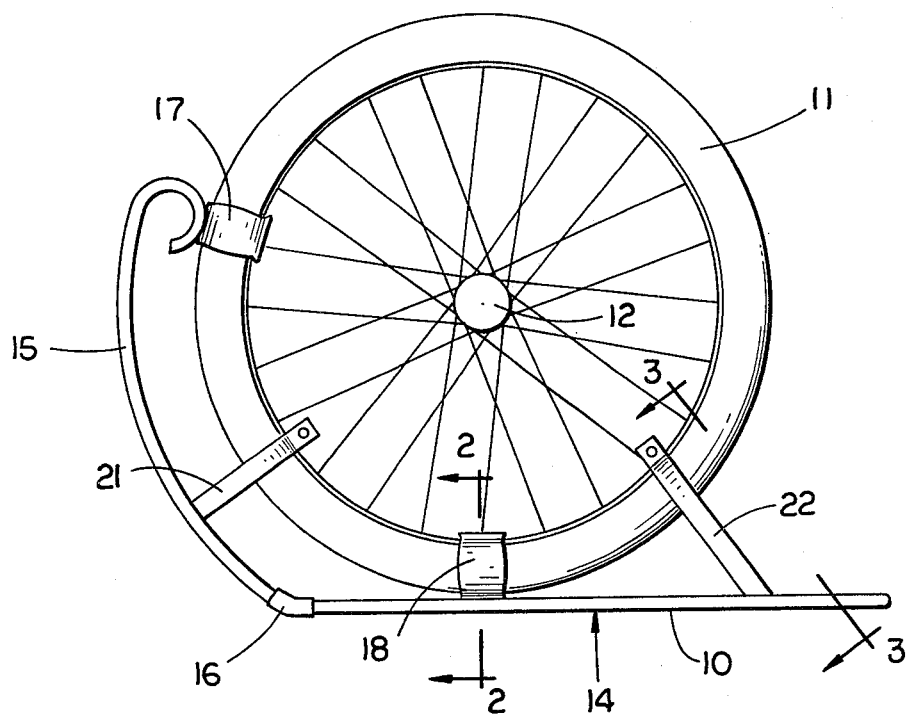
FIG. 1 is a side view of a wheel having the preferred embodiment of a ski or glide removably mounted thereto.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figures 2, 3:
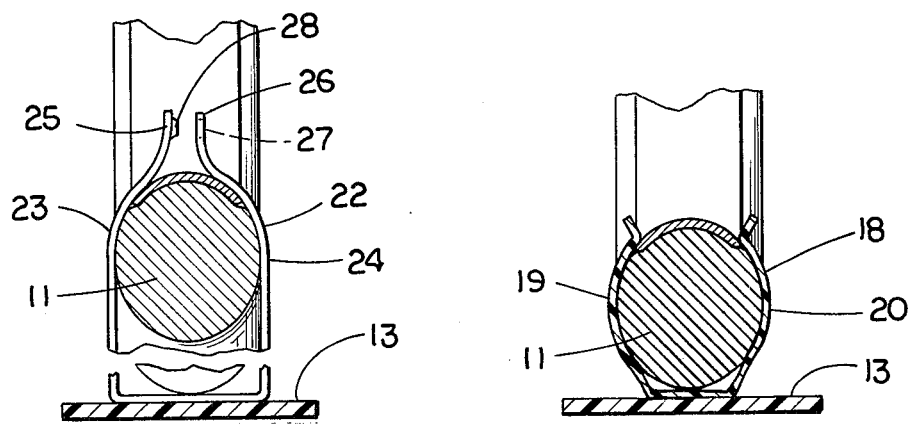
FIG. 2 is an enlarged cross-sectional view taken along line 2—2 of FIG. 1 and viewed in the direction of the arrows.
FIG. 3 is an enlarged cross-sectional view taken along line 3—3 of FIG. 1 and viewed in the direction of the arrows.

Referring more particularly to FIGS. 1-3, there is shown the preferred embodiment of the present invention. The glide or ski 10 is removably attachable to a conventional wheel 11 rotatably mounted about hub 12 with the rim of the wheel being supported relative to the hub by a plurality of spokes. It is to be understood that the present invention is also operable with a solid wheel not provided with the spokes shown in FIG. 1.

Ski 10 includes a rigid elongated horizontally extending runner 13 (FIG. 2) having a bottom surface 14 (FIG. 1) of suitable width to support a load atop snow or ice. For example, the width of runner 13 as considered in the direction of the rotatable axis of wheel 11 should not be less than one and one-half times the width of the wheel. An upwardly extending plow runner 15 is aligned with and connected to the horizontal runner 13 with a connecting means 16 provided between runners 13 and 15 and being contiguous thereto to allow the plow runner 15 to be swung upwardly to extend partially around wheel 11 positioned atop horizontal runner 13. Connecting means 15 includes a flexible plastic portion which is integrally connected to the adjacent ends of runners 13 and 15 thereby allowing runner 15 to be swung upwardly to the correct location, depending upon the radius or outside diameter of wheel 11. Likewise, portion 16 may be provided with a conventional living hinge to achieve the flexible motion. Such a living hinge typically includes a groove or reduced thickness to provide for the pivoting action. Runners 13 and 15 may be produced from a hard plastic or other rigid material.

A plurality of clamps are provided on runners 13 and 15 to engage wheel 11 and removably secure the ski to the wheel. In the embodiment shown in FIG. 1, two different types of clamps are shown. Clamps 17 and 18 are identical and are fixedly mounted respectively to runners 15 and 13. Clamp 18 will now be described, it being understood that an identical description applies to clamp 17. Clamp 18 has a main body fixedly attached to the top surface of horizontal runner 13 and includes a pair of upwardly extending flanges 19 and 20 positioned apart but spring biased against the outer surfaces and periphery of wheel 11. The bottom end portions of flanges 19 and 20 are integrally connected together whereas the top distal ends are spaced apart to allow for the insertion and removal of the wheel from the flanges. Normally, flanges 19 and 20 are spaced apart a distance less than the width of wheel 11 but are yieldable to allow for the positioning of the wheel therebetween. The flanges may be made from a suitable material, such as plastic or metal. Clamp 17 is attached to the uppermost portion of runner 15.

Clamps 21 and 22 are also identical and are respectively connected to runners 15 and 13 with clamp 22 now being described, it being understood that a similar description applies to clamp 21. Clamp 22 is fixedly mounted to the horizontal runner 13 and has a pair of flexible arms 23 and 24 extending upwardly around the wheel with the arms having, respectively, top distal ends 25 and 26 positioned inwardly of the tire portion of the wheel. An aperture 27 is provided in the top distal end 26 whereas a projection 28 is positioned in end 25. Projection 28 is slightly greater than the diameter of aperture 27 to allow for an interference fit between the projection and aperture. The arms are shown as unattached in FIG. 3 prior to the snapping of projection 28 into aperture 27. Arms 22 and 23 are produced from a flexible or yieldable material to allow for the insertion of projection 28 into aperture 27 and for the removal thereof in case it is desirable to remove the ski from the wheel. The aforementioned clamps limit relative motion between the ski and wheel. Runner 15 at the location of clamp 21 is spaced apart from the periphery of wheel 11 whereas wheel 11 sits immediately atop runner 13 at clamp 18 thereby allowing for spring action or movement of runner 15 toward wheel 11 in the event runner 15 strikes a foreign object such as a curb.

Figure 4:
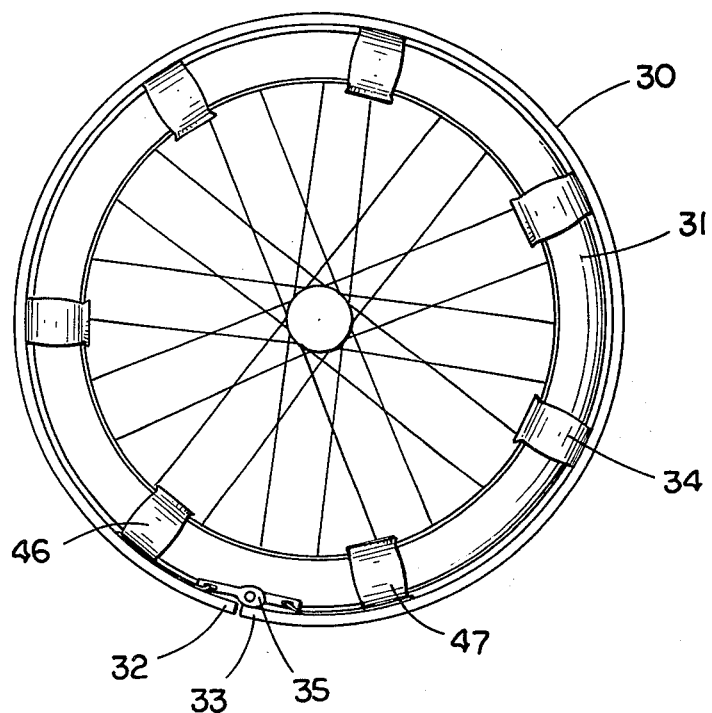
FIG. 4 is the same view as FIG. 1 only showing an alternate embodiment of the ski or glide.
Figure 5:
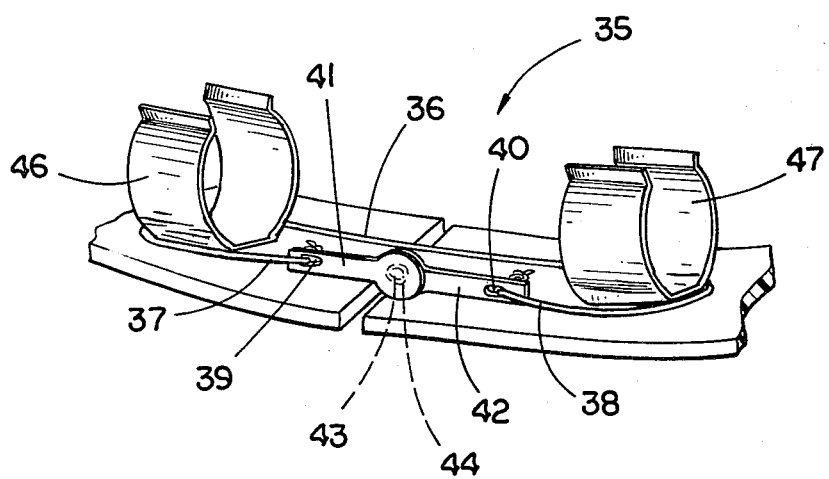
FIG. 5 is an enlarged perspective view of the means used to connect the opposite ends of the glide strip of FIG. 4 together.

An alternate embodiment of the wheel glide is shown in FIG. 4. A flexible strip 30 is removably attachable to wheel 31 and wheel 31 being identical to the wheel shown in FIG. 1. Flexible strip 30 is longitudinally flexible so as to wrap around wheel 31 but is laterally rigid to support the wheel over snow and ice. For example, the width of strip 30 should be at least one and one-half times the width of wheel 31. In order to accommodate a variety of different-sized wheels, strip 30 is provided in roll form and may be cut to length to fit the particular wheel size. The strip 30 should be cut so the opposite ends 32 and 33 are adjacent once the strip extends peripherally around the wheel. Fixedly attached to the top surface of strip 30 are a plurality of clamps 34 engageable with wheel 31 and operable to removably hold the strip peripherally on the wheel. Clamps 34 are identical to clamps 17 and 18 and thus will not be further described, it being understood that an identical description applies thereto.

Strip fastening means 35 is engaged with at least two of the clamps and is operable to hold ends 32 and 33 together while the strip or wheel glide is on wheel 31. Strip means 35 includes a tie or string-configured element 36 having a pair of opposite free ends 37 and 38 extendable through, respectively, a pair of slots 39 and 40 provided in fastener arms 41 and 42. Arm 41 is provided with a projection 43 which removably fits into an aperture 44 with projection 43 and aperture 44 being identical to that described for projection 28 and aperture 27. Means 35 may also be in the form of metal brackets extending around clamps 46 and 47 being secured together by a metal chain.

In order to fit the ski or glide shown in FIG. 4 onto a particular wheel, strip 30 is cut to size to position ends 32 and 33 together once the strip is mounted to the wheel and clamps 34 are engaged with the tire portion of the wheel. Tie 36 is then extended around the clamps 46 and 47 which are positioned closest to ends 32 and 33 with the opposite ends of tie 36 then being extended through slots 39 and 40 and tied into knots in such a manner that tie 36 forces clamp 46 toward clamp 47 thereby securing the strip onto the wheel. In order to remove the wheel glide, aperture 44 and projection 43 are moved apart thereby allowing for the unwrapping of tie 36 from clamps 46 and 47 with the remaining clamps then being disengaged from the wheel. Tie 36 when properly mounted extends across and atop the opposite end portions 32 and 33 of strip 30.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A snow ski removably attachable to a shopping cart wheel comprising:

a longitudinally flexible but laterally rigid strip of material with opposite ends and extendable peripherally around a wheel being initially provided in roll form and cut to length to fit said shopping cart wheel, said strip having a width of at least one and one-half times the width of said wheel to support same atop snow;

clamp means fixedly mounted on said strip and engageable with said wheel being operable to removably hold said strip peripherally on said wheel, said clamp means including a plurality of clamps fixedly attached to and atop said strip, each of said clamps has a pair of upwardly extending spaced apart arms with integrally connected proximal ends forming a portion coplanar with said strip and spring biased distal ends grippingly positioned around said wheel to hold said strip to said wheel with said strip rotating with said wheel; and strip fastening means engaged with said clamp means and operable to hold said ends together while said strip is on said wheel, said strip fastening means including a pair of fastener strips with adjacent ends and opposite slotted end portions, said adjacent ends including a projection and complementary receiving aperture thereon releasably connecting said adjacent ends together, said strip fastening means further including a string configured element extending across said opposite ends of said strip to and around at least two of said clamps located closest to and on opposite sides of said opposite ends of said strip, said string having opposite free ends extendable through said slotted end portions forcing said two clamps closer together.

* * * * *